US009799065B1

(12) United States Patent
Dorner (10) Patent No.: US 9,799,065 B1
(45) Date of Patent: Oct. 24, 2017

(54) ASSOCIATING ITEMS BASED AT LEAST IN PART ON PHYSICAL LOCATION INFORMATION

(71) Applicant: Amazon Technologies, Inc., Reno, NV (US)

(72) Inventor: Charles Shearer Dorner, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 687 days.

(21) Appl. No.: 14/305,833

(22) Filed: Jun. 16, 2014

(51) Int. Cl.
*G06Q 30/06* (2012.01)

(52) U.S. Cl.
CPC ..... *G06Q 30/0631* (2013.01); *G06Q 30/0639* (2013.01)

(58) Field of Classification Search
None
See application file for complete search history.

(56) References Cited

U.S. PATENT DOCUMENTS

| | | | | |
|---|---|---|---|---|
| 6,460,011 B1* | 10/2002 | Jacquez | ................. | G06F 17/18 435/153 |
| 6,574,549 B2* | 6/2003 | Cato | ..................... | G01C 21/20 340/8.1 |
| 6,853,982 B2* | 2/2005 | Smith | .................... | G06Q 30/02 705/26.7 |
| 7,424,447 B2* | 9/2008 | Fuzell-Casey | ......... | G06Q 30/02 705/26.8 |
| 8,117,212 B2* | 2/2012 | Tateno | ............. | G06F 17/30386 707/749 |
| 8,706,406 B2* | 4/2014 | Kalaboukis | ............ | H04W 4/02 701/423 |
| 9,001,059 B2* | 4/2015 | Wibbeler | ............. | G06F 3/0488 345/173 |
| 9,311,046 B1* | 4/2016 | Hicks | | |
| 9,600,840 B1* | 3/2017 | Pope | .................. | G06Q 30/0631 |
| 2002/0010625 A1* | 1/2002 | Smith | ................... | G06Q 30/02 705/14.52 |
| 2002/0082805 A1* | 6/2002 | Jacquez | ................. | G06F 17/10 702/179 |

(Continued)

OTHER PUBLICATIONS

Kim, S.H., et al., "Agent-Based Model for Improved Recommendations Using a Relation List, An" Journal of International Business and Economics, vol. 8, No. 3, p. 123, Sep. 2008.*

*Primary Examiner* — Nicholas D Rosen
(74) *Attorney, Agent, or Firm* — Knobbe, Martens, Olson & Bear, LLP (57) ABSTRACT

Systems and methods are provided for associating items based at least in part on physical location information that includes a physical location of at least two items. By associating items based at least in part on physical location information, associations among items may be identified that would otherwise be difficult to determine without usage of physical location information. In one embodiment, physical location information of various items may be collected by electronically recording the physical location of the items in a physical retail store. A degree of association may be derived from an analysis of the physical proximity between the items. The determined association information may later be used to recommend items to a user or for other purposes.

16 Claims, 6 Drawing Sheets

(56) References Cited

U.S. PATENT DOCUMENTS

| | | | |
|---|---|---|---|
| 2002/0128765 A1* | 9/2002 | Cato | G01C 21/20 |
| | | | 701/433 |
| 2004/0039661 A1* | 2/2004 | Fuzell-Casey | G06Q 30/02 |
| | | | 705/26.81 |
| 2008/0077575 A1* | 3/2008 | Tateno | G06F 17/30386 |
| 2009/0326800 A1* | 12/2009 | Kalaboukis | H04W 4/02 |
| | | | 701/533 |
| 2012/0197751 A1* | 8/2012 | Zatkin | G06Q 30/0631 |
| | | | 705/26.7 |
| 2012/0284105 A1* | 11/2012 | Li | G06Q 30/06 |
| | | | 705/14.23 |
| 2013/0328788 A1* | 12/2013 | Wibbeler | G06F 3/0488 |
| | | | 345/173 |
| 2014/0132595 A1* | 5/2014 | Boulanger | G06T 19/20 |
| | | | 345/419 |
| 2015/0106224 A1* | 4/2015 | Stevens | G06Q 30/0631 |
| | | | 705/26.7 |

\* cited by examiner

ASSOCIATING ITEMS BASED AT LEAST IN PART ON PHYSICAL LOCATION INFORMATION

BACKGROUND

Electronic commerce is a popular way of selling items (e.g., goods and/or services) to consumers. A typical electronic commerce system may provide user interfaces that enable consumers to browse and/or purchase items from a merchant or seller associated with the electronic commerce system. Item listings may typically be located using a search engine or by browsing item categories or lists. A typical electronic commerce system may additionally provide a user with information identifying recommended items (such as products and/or services) that may be of potential interest to the user. Often, the recommended items are selected by the electronic commerce system based on past browsing or purchasing behavior of users. For example, if users that purchased a given first item often also purchased a given second item, an electronic commerce system may recommend the second item to a user that has expressed interest in the first item.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to a computer system that associates items based at least in part on physical location information for at least two items. By associating items based at least in part on physical location information, the system may present or recommend to a user additional items whose associations may otherwise be difficult to determine without usage of physical location information. For example, it may be challenging to determine associations between items, especially items such as clothing, due to changes in fashion and consumer preferences. However, retail merchandisers or other employees at a physical retail store, such as a department store often make determinations, such as when arranging retail displays, of items that should be placed on the same shelf, on the same mannequin, in the same display case and/or displayed in separate sections of a store. Accordingly, in some embodiments, the system may generate association information between items based at least in part on the physical arrangement of items in one or more physical locations, such as in a physical retail store, promotional display or other location(s). Association information may include any type of information that associates at least two items with each other, as will be explained further below. This association information may associate one or more additional items with an item of interest based at least in part on a degree of association. This degree of association may be derived from an analysis of the physical proximity between the item of interest and each of the additional items, such as the physical distance between a physical location of the item of interest and a physical location of each of the additional items. The degree of association may also be determined based in part on attribute information and/or other information concerning the item of interest and the additional items, as discussed further below. In some embodiments, the item of interest for which additional items may be presented may be determined to be of interest in a variety of ways. For example, the item of interest may be an item that results from a search query from a user or an item previously purchased or browsed by a user. In other embodiments, the item of interest may be any item that is determined to be presented on a page or other user interface (such as a default item that appears on a user interface prior to any user input and not necessarily based on any user information).

For example, according to one embodiment, various items of clothing may be presented in a physical retail store. Each item of clothing may have an attached tag that may be used by one or more computing devices to determine the physical location of the item of clothing within the physical retail store. Physical location information of the various items of clothing may be collected by recording the physical location of each of the items based at least in part on a sensor that senses the physical location of the tags. This physical location information may be aggregated in an electronic data store and analyzed by a computing system to determine, among other things, the physical proximity of (or distance between) each of the items. A degree of association derived from the analysis of the physical proximity may be stored as association information between various items. The derived and stored association information may be subsequently used in a variety of manners, such as to recommend related items, generate virtual displays, establish collections of items, offer packages of related items, suggest additional purchases to a user and/or other uses. For example, when a user expresses interest in a first item, the user may be presented with item identification information identifying any recommended additional items based at least in part on the stored association information.

According to one embodiment, associating items based at least in part on physical location information may be implemented by an association module stored in the memory of, and implemented by, a relationship server. The relationship server may be in communication with an item relationship data store that stores association information, as discussed further below. A user may browse an inventory of items and select an item of interest, such as an item for which the user has requested to view item attribute information. Based at least in part on the selection, the association module may cause presentation of item identification information identifying the additional item as a recommended item for the user based at least in part on the stored association information in the item relationship data store.

For example, according to one embodiment, a relationship server, as described herein, may determine that a medium weight wool scarf is the item of interest. The relationship server may then access the association information, stored within an item relationship store or generated in real time, and present the user with soft leather gloves as an additional item recommended to the user based at least in part on the user's interest in the medium weight wool scarf. The stored association information may have been determined based at least in part on, for example, a determination that the scarf and the gloves were physically located very near each other in one or more physical retail displays previously analyzed by the relationship server.

Figure 1:
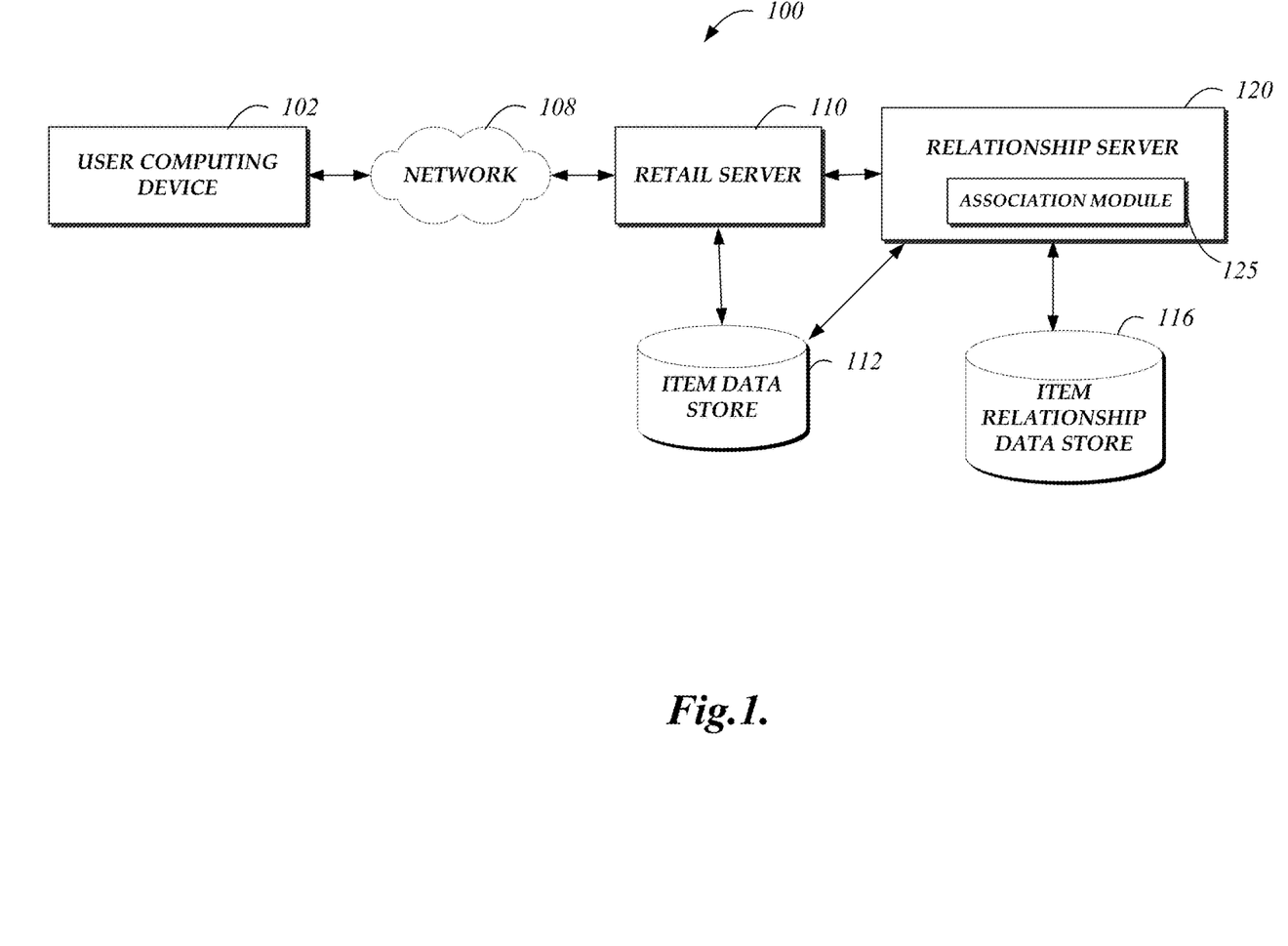
FIG. 1 is a block diagram depicting an illustrative operating environment for associating items based at least in part on physical location information.

The illustrative operating environment shown in FIG. 1 includes a marketplace system 100 which enables users to browse and place orders for items (such as items listed in an electronic catalog). The marketplace system 100 may include one or more relationship servers 120 that include an association module 125 stored in memory therein that may be used to implement various aspects of the present disclosure, such as generating association information between different items and using the generated association information to recommend items to users, as discussed herein. The marketplace system 100 may also include one or more retail servers 110 that facilitate electronic browsing and purchasing of items, such as goods and/or services, using various user devices, such as a user computing device 102. Those skilled in the art will recognize that the user computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, tablet computer, gaming console or controller, and the like.

The relationship server 120, which will be described below in more detail, may be connected to or in communication with an item relationship data store 116 that may store association information, physical location information and/or other information. The retail server 110 may be connected to or in communication with an item data store 112 that stores item attribute information and other data regarding a number of items, such as items listed in an electronic catalog as available for browsing and/or purchase via the retail server 110. Item data stored in item data store 112 may include any information related to each item. For example, item data may include, but is not limited to, price, availability, title, item identifier, item image, item description, item attributes, keywords associated with the item, etc. Item attributes may include, for example, size, color, weight, style, gender, author, brand, publisher and/or others, depending on the embodiment and the type or category of item. In some embodiments, the item data store 112 may store digital content items (e.g., audiobooks, electronic books, music, movies, multimedia works, text documents, etc.). In other embodiments, the information in item data store 112 and item relationship data store 116 may be stored in a single data store connected to or in communication with the relationship server 120 and/or retail server 110.

In some embodiments, the item data store may include an electronic catalog system, of information about items that may be listed for sale by sellers, merchants and/or other users. The item information in this data store may be viewable by end users through a browsable electronic catalog in which each item may be described in association with a corresponding network page that describes the item (referred to herein as an "item detail page"). Each item detail page may include, for example, an item image and description, customer ratings, customer and professional reviews, sales rank data, lists of related items, and/or other types of supplemental data that may assist consumers in making informed purchase decisions. Users of the system may, in some embodiments, locate specific item detail pages within the electronic catalog by executing search queries, navigating a browse tree, and/or using various other navigation techniques. In some embodiments, reviews and other item information for items in an electronic catalog may be viewed outside of a retail or marketplace setting, such as in an informational setting that enables users to evaluate items that are not necessarily offered for sale to the users. While aspects of the present disclosure apply primarily to physical items, such as physical goods, aspects of the disclosure may additionally or alternatively apply to digital items, virtual items and/or services, in some embodiments.

As used herein, the term "item," in addition to having its ordinary meaning, is used interchangeably to refer to an item itself (e.g., a particular product, service, any of the items referred to above, or the like) and to its description or representation in a computer system. As will be apparent from the context in which it is used, the term "item" is also sometimes used herein to refer only to the item itself or only to its representation in the computer system. Further, not necessarily all advantages described herein are shared by every embodiment of this disclosure.

In different embodiments, each of the item data store 112 and/or item relationship data store 116 may be local to the relationship server 120, may be local to the retail server 110, may be remote from both the relationship server 120 and the retail server 110, and/or may be a network-based service itself. In the environment shown in FIG. 1, a user of the marketplace system 100 may utilize the user computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art and, thus, are not described in more detail herein.

The marketplace system 100 is depicted in FIG. 1 as operating in a distributed computing environment comprising several computer systems that are interconnected using one or more computer networks. The marketplace system 100 could also operate within a computing environment having a fewer or greater number of components than are illustrated in FIG. 1. Thus, the depiction of marketplace system 100 in FIG. 1 should be taken as illustrative and not limiting to the present disclosure. For example, the marketplace system 100 could implement various Web services components and/or peer-to-peer network configurations to implement at least a portion of the processes described herein.

In brief, the retail server 110 is generally responsible for providing front-end communication with various user devices, such as the user computing device 102, via the network 108. The front-end communication provided by the retail server 110 may include generating text and/or graphics, possibly organized as a user interface using hypertext transfer or other protocols in response to information inquiries received from the various user devices. The retail server 110 may obtain information on available goods and services from one or more data stores, such as item data store 112, as is done in conventional electronic commerce systems. In certain embodiments, the retail server 110 may also access item data from other data sources, either internal or external to marketplace system 100. While the marketplace system 100 is often described herein with respect to an embodiment in which the relationship server 120 communicates with the retail server 110 in a retail environment, in other embodiments, the relationship server 120 may operate independently of the retail environment. For example, the relationship server may be operated in association with a service that provides information regarding items, such as products, services, movies, people, events and/or items of various other types without necessarily enabling purchase of items. In some such embodiments, the relationship server 120 may communicate with the user computing device 102 and/or item data store 112 without the presence of the retail server 110. In other embodiments, the user computing device 102 or the retail server 110 may include an association module 125, as described herein, such that a separate relationship server may not be present in certain embodiments.

Figure 2:
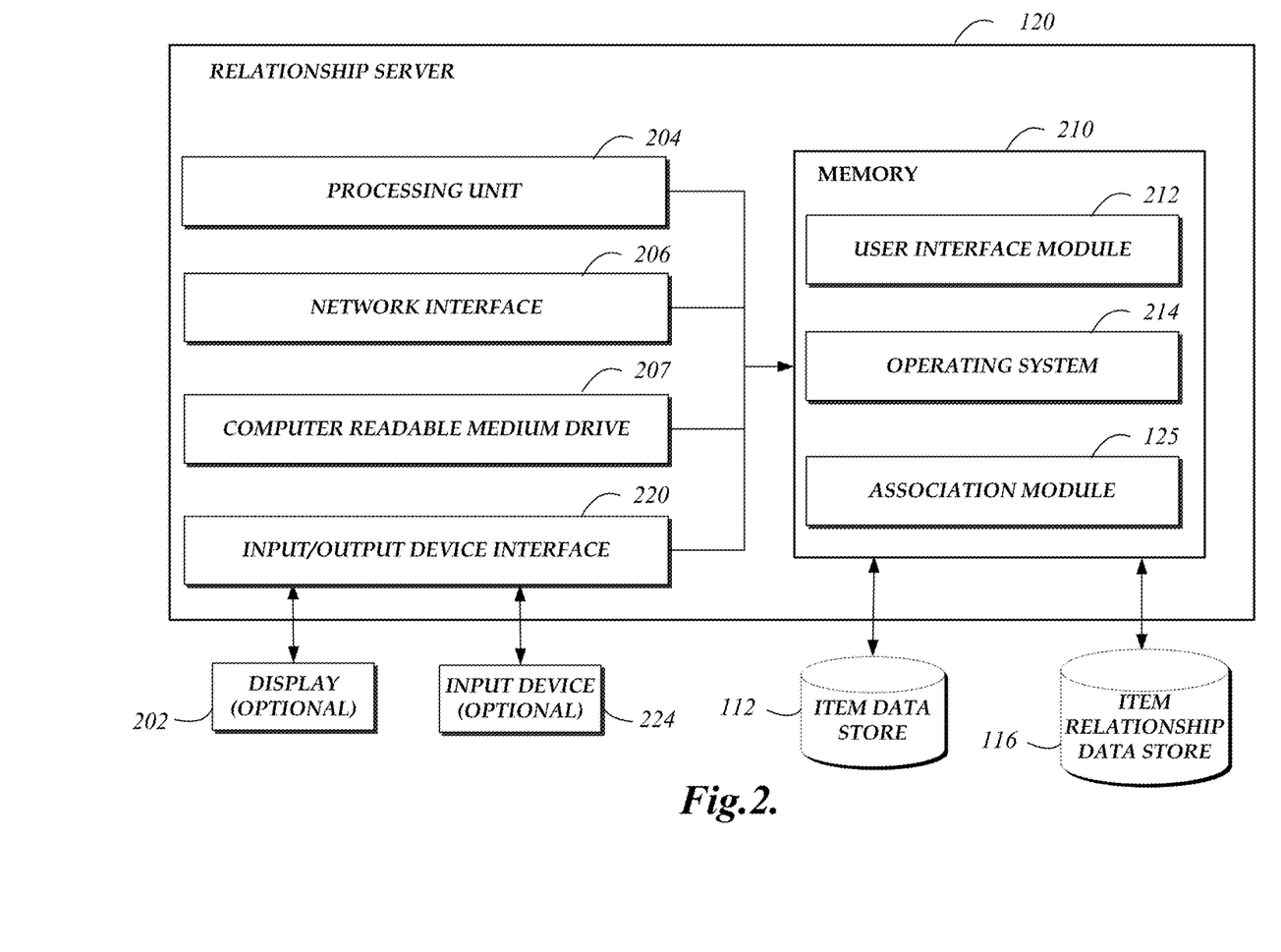
FIG. 2 depicts a general architecture of a computing device for associating items based at least in part on physical location information.

FIG. 2 depicts an example of a general architecture of the relationship server 120 for generating association information between different items and presenting additional items as recommendations for an item of interest. The general architecture of the relationship server 120 depicted in FIG. 2 includes an arrangement of computer hardware and software components that may be used to implement aspects of the present disclosure. The relationship server 120 may include many more (or fewer) components than those shown in FIG. 2. It is not necessary, however, that all of these generally conventional components be shown in order to provide an enabling disclosure. As illustrated, the relationship server 120 includes a network interface 206, a processing unit 204, an input/output device interface 220, a display 202 (optional), an input device 224 (optional), and a computer-readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for the optional display 202 via the input/output device interface 220. The input/output device interface 220 may also accept input from the optional input device 224, such as a keyboard, mouse, digital pen, microphone, touch screen, etc.

The memory 210 contains computer program instructions (grouped as modules in some embodiments) that the processing unit 204 executes in order to implement one or more embodiments. The memory 210 generally includes RAM, ROM and/or other persistent, auxiliary or non-transitory computer-readable media. The memory 210 may store an operating system 214 that provides computer program instructions for use by the processing unit 204 in the general administration and operation of the relationship server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a browser installed on the computing device. In addition, memory 210 may include or communicate with an item relationship data store 116, item data store 112 and/or one or more other data stores, as discussed above with reference to FIG. 1.

In addition to the user interface module 212, the memory 210 may include the association module 125 that may be executed by the processing unit 204. In one embodiment, the association module 125 implements various aspects of the present disclosure, e.g., generating association information between different items, presenting additional items as recommendations for an item of interest, retrieving physical location information, determining physical proximity of items, determining degrees of association between items, etc., as described further below. While the association module 125 is shown in FIG. 2 as part of the relationship server 120, in other embodiments, all or a portion of the association module 125 may be a part of the retail server 110 and/or a user computing device, such as user computing device 102. For example, in certain embodiments of the present disclosure, the retail server 110 may include several components that operate similarly to the components illustrated as part of the relationship server 120, including a user interface module, association module, processing unit, computer-readable medium drive, etc. In such embodiments, the retail server 110 may communicate with an item relationship data store, such as item relationship data store 116 and the relationship server 120 may not be needed in certain embodiments. Further, although certain examples are illustrated herein in the context of a retail server 110, this is not a limitation on the systems and methods described herein.

Moreover, the processing of the various components or modules the relationship server 120 can be distributed across multiple machines, networks, or other computing resources. The various components or modules of the relationship server 120 can also be implemented in one or more virtual machines or hosted computing environment (e.g., "cloud") resources, rather than in dedicated servers. Likewise, the data repositories shown can represent local and/or remote, physical and/or logical data storage, including, for example, storage area networks or other distributed storage systems. In some embodiments, the connections between the components or services shown represent possible paths of data flow, rather than actual connections between hardware. While some examples of possible connections are shown, any subset of the components shown can communicate with any other subset of components in various implementations.

Figure 3:
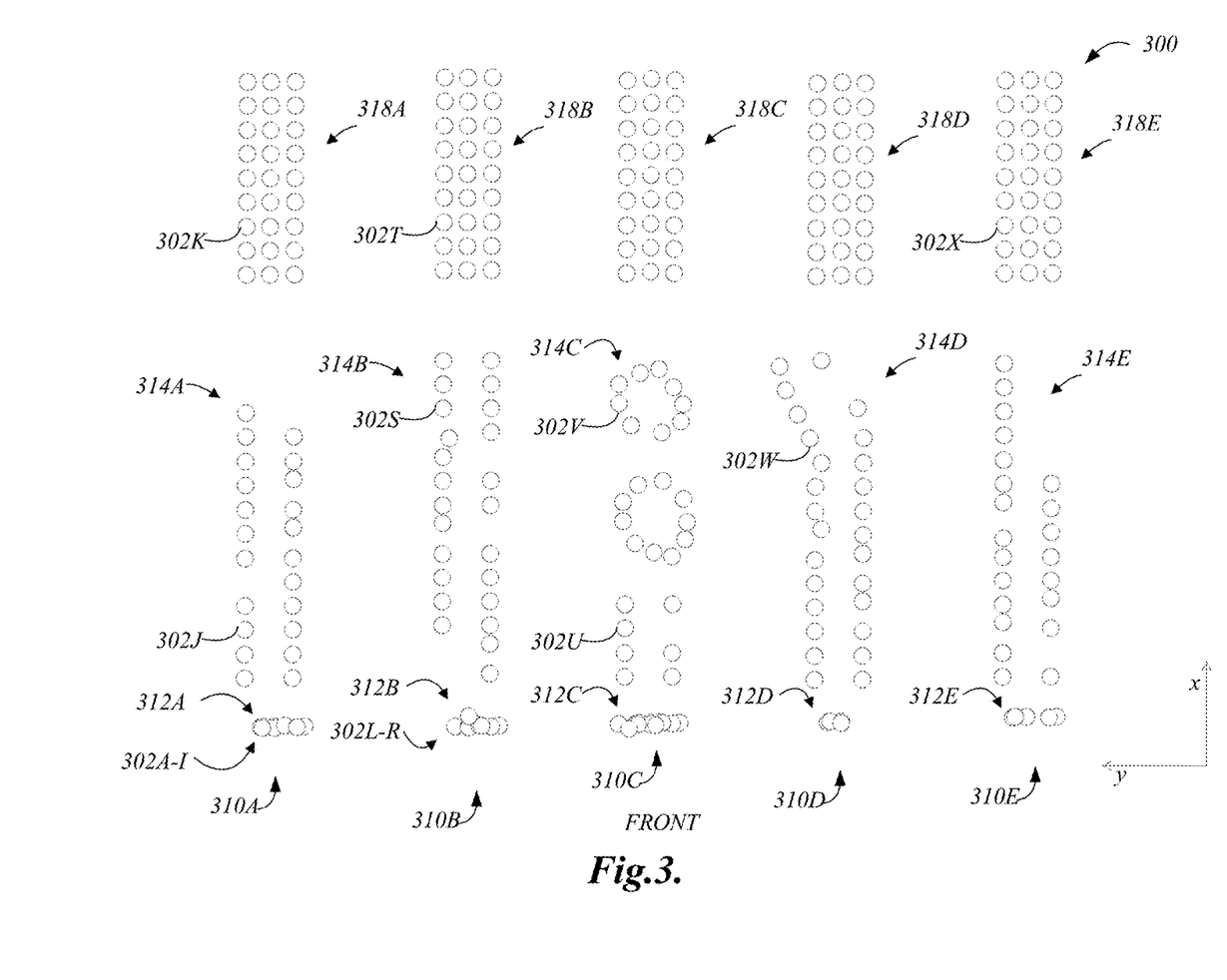
FIG. 3 depicts an illustrative representation of two dimensional physical location information across an x and y axis associated with a plurality of items in a physical retail store.

FIG. 3 depicts an illustrative representation of two dimensional physical location information across an x and y axis associated with a plurality of items in a physical retail store. The physical location information 300 includes a physical location 302A-X of each item. Here, the physical location information 300 is an abstraction of the item locations in the store as determined by the relationship server 120. This abstraction reflects the relative physical location information determined by the relationship server 120 based on determined, received or retrieved data concerning a physical location, such as universal coordinates or other location data. As discussed further below, this physical location information may be provided by a tag attached to each item. Although the physical location information 300 in FIG. 3 is represented in two dimensions, the physical location information 300 may also be represented in three dimensions as discussed in FIG. 4 below. Furthermore, although the physical location information in FIG. 3 is represented in Cartesian coordinates, any system may be utilized to represent the physical location information 300, such as but not limited to a spherical coordinate system.

In some embodiments, the physical location information 300 may be collected by a sensor that reads a tag located on an item. The tag may be placed on the item or near the item in a location that best represents the physical location of the item. The tag may be any tag from which a physical location, such as location 302A, may be read by a sensor, such as (but not limited to) a Radio Frequency Identification (RFID) tag or Near Field Communication (NFC) device. In yet other embodiments, the tag may include an optical code, such as a one- or two-dimensional bar code, that may be read by a sensor such as a bar code reader. The sensor may read the physical location 302A of the tag, and thereby the item, in any manner. The sensor may be implemented as a single sensor or collection of sensors. For example, the sensor may read the physical locations 302A-X of the tags continuously or only in certain intervals of time (such as where the sensor may record the physical location of all of the tags in a physical retail store at once or where the sensor may read the physical location of particular tags in a certain area, such as on a mannequin, rack, shelf, corner or other physical area). In some embodiments, the sensor may read the physical location 302A-X of all the tags in the physical retail store or other physical space at the same time or only individual tags or smaller collections of tags at different times (such as being read as a person walks around the physical retail store). Depending on the embodiment, the sensors may be handheld devices or other mobile devices, or may be attached or placed on furniture, display areas, shelves, tables and/or other places. Furthermore, although the sensor may read the physical location of the tag one or more times in a single physical retail store, the sensor may also read the physical location of the tag at different times in different locations, not limited to different physical retail store locations (such as when the item is moved for presentation at different physical retail store locations).

In some embodiments, several items may be duplicate copies of each other. For example, an item such as a shirt, hammer or pencil may be part of a number of mass produced shirts, hammers or pencils. These items may be stored with item attribute information that groups each of the duplicate items together. In some embodiments, each item may have a unique item identifier, such as a Universal Product Code, that may be used to identify different copies of the same underlying item. Different copies of the same item may be grouped or analyzed together using a variety of identification methods, such as by the location tags themselves providing item attribute information when read or by retrieving item attribute information concerning the items in a data store. For example, mapping information may be stored that associates an item identifier of an item with a given tag identifier placed on or near the item. This indication that the item is a duplicate copy of another item may be useful as association information of duplicate copies of an item can be cross referenced with each other. For example, a mass produced item such as a shirt may have several duplicate copies within a same physical retail store and across several different physical retail stores.

In certain embodiments, physical location information may be any record of the physical location of items. The physical location of items may be collected in any manner that identifies an item with a physical location. For example, physical locations may be determined by sensing a signal emitted from an item (such as an electromagnetic signal emitted from a tag on an item, as discussed above) or by determining the location of an item without receiving a signal from the item. For example, a GPS-enabled device may be attached to or placed near each item that records its location and/or send its location coordinates to another system or device. Each of the physical locations may be referenced by a corresponding item identifier that allows the physical locations to be cross-referenced with a corresponding item with item attribute information in an item data store. For example, a tag on an item may be attributed with a unique item identifier for the tag that, when read by a sensor, may be used to identify an item and look up item attribute information (via a look up table or other data structure) for that item. The physical location information may be stored with raw data (such as unprocessed coordinates of a location) or processed data (such as a location identified relative to a point of reference, e.g. on a particular rack or within a particular section of a room).

For example, in the illustrated embodiment of FIG. 3, the physical locations 302A-X of each item in the physical retail store may reflect clothing items in a physical retail store for clothing. The physical retail store may have items arranged based at least in part upon themes. Each theme may be represented across five rows 310 in the physical retail store with a row 310A for women's winter wear, a row 310B for women's formal wear, a row 310C for youth wear, a row 310D for men's summer wear and a row 310E for men's formal wear. At the front of each row may be a mannequin, such as mannequins 312A-E, featuring various items, as will be discussed further in FIG. 4. The items featured on the mannequins 312A-E may be a combination of items arranged by a professional (such as a retail merchandiser, employee or other individual associated with the store or other physical location) based on current fashions or how well each of the items matches with each other. Behind each of the mannequins 312A-E may be racks 314A-E of items of clothing, such as rack 314A for women's winter wear, a rack 314B for women's formal wear, a rack 314C for youth wear, a rack 314D for men's summer wear and a rack 314E for men's formal wear. Each of the items of clothing in a given row may be associated with a similar theme, category, color, style, gender, price, size and/or other attribute(s) or qualities, as determined by one or more individuals responsible for the arrangement of the items. The items of clothing may also include items of clothing featured on the mannequins 312A-E. Behind the racks 314A-E of items of clothing may be tables 318A-E of items for accessorizing separated from the racks 314A-E of items of clothing by an aisle. The items for accessorizing may be items associated with the theme of the particular nearby row, such as ties that may be of interest to a customer shopping for men's dress shirts in the row 310E for men's formal wear.

In the illustrated embodiment of FIG. 3, the physical location information reflects how the physical locations of the items in the rows may not necessarily be uniform. This non-uniformity may be due to consumers and retailers arranging the items differently in order to better present the items and/or due to the effects of consumers physically moving items when browsing through the items. In some embodiments, the physical location information may be collected while the items are being used for purposes other than display, such as when the items are brought together to a fitting room for a consumer to try on.

Figure 4:
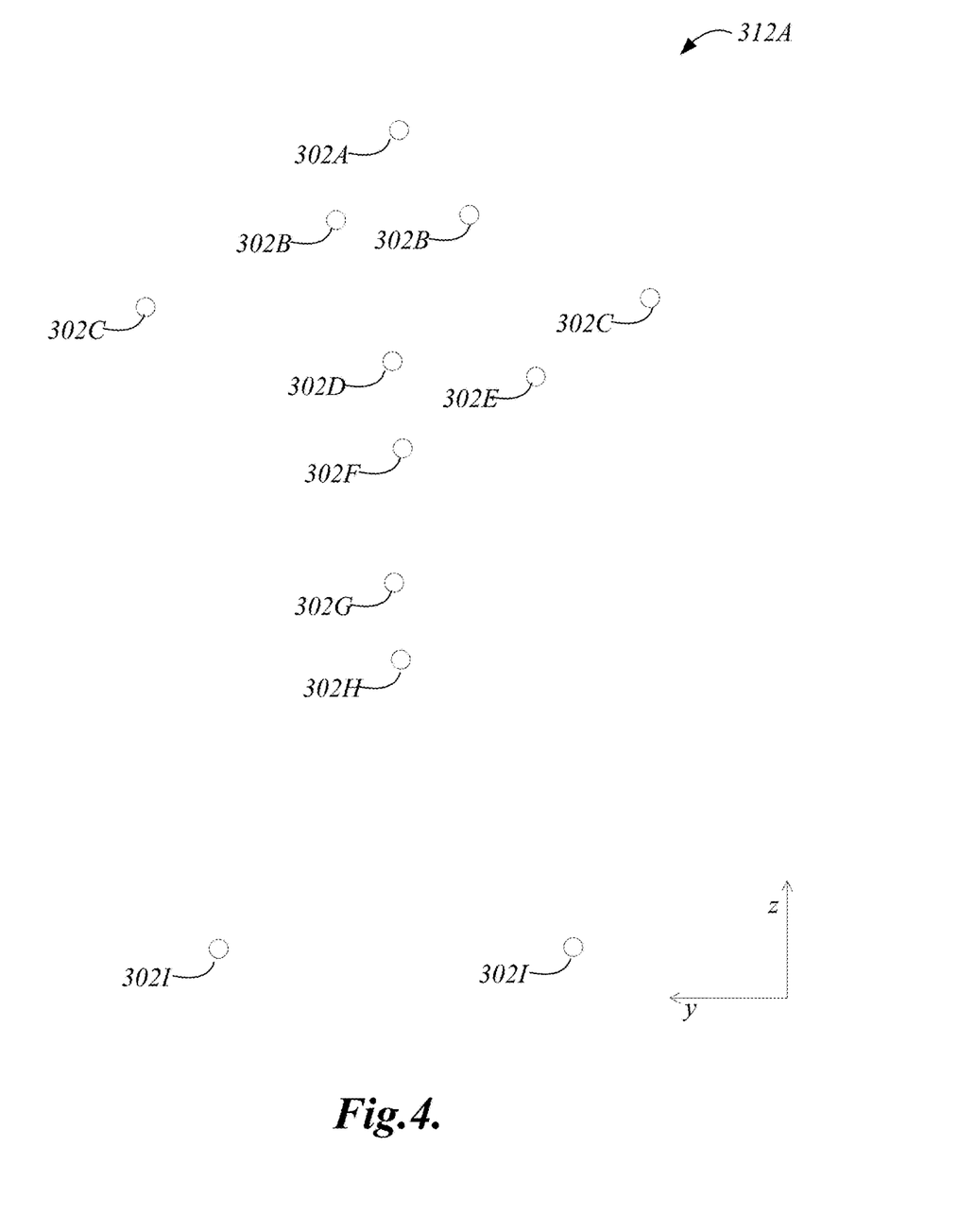
FIG. 4 depicts an illustrative representation of two dimensional physical location information across a y and z axis associated with a plurality of items in the physical retail store of FIG. 3.

FIG. 4 depicts an illustrative representation of two dimensional physical location information 300 across a y and z axis associated with a plurality of items featured on the mannequin 312A of FIG. 3. Thereby, the combination of FIGS. 3 and 4 also illustrates a representation of physical location in three dimensions across the x, y and z axis. For example, in the illustrated embodiment of FIG. 4, the physical locations 302A-X of items such as a physical location 302A of a hat, physical locations 302B of earrings, physical locations 302C of gloves, physical location 302D of a scarf, physical location 302E of a purse, physical location 302F of a shirt, physical location 302G of pants, physical location 302H of a belt and physical locations 302I of shoes are illustrated. It will be appreciated that while two dimensional location information may indicate that the physical location of the various items on the mannequin 312A-E are nearly identical (such that the hat does not appear from the two dimensional data to be any closer to the gloves than to the shoes), three dimensional location information may be used to determine that, for example, the hat is closer to the gloves than to the shoes.

Figure 5:
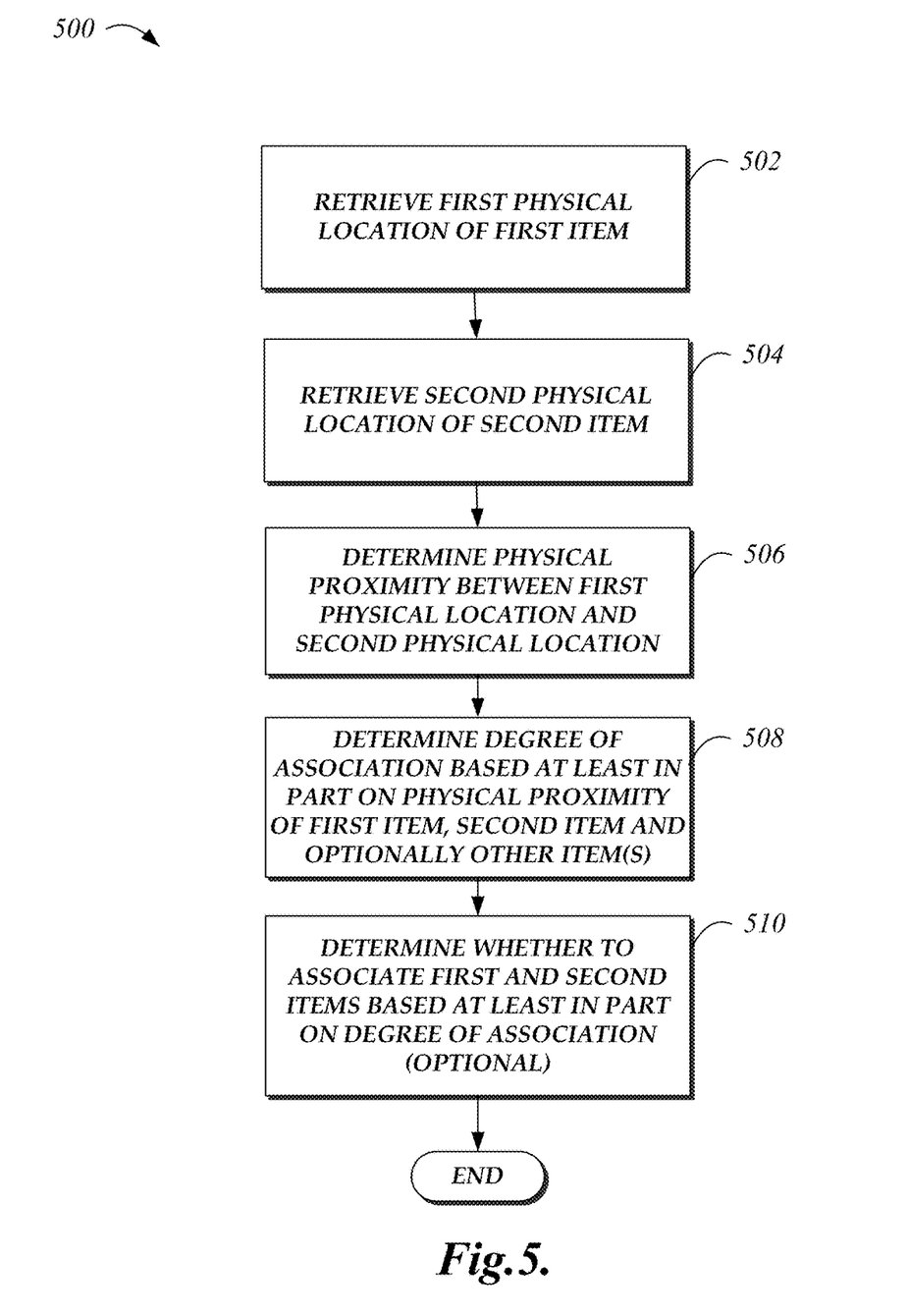
FIG. 5 is a flow diagram of an illustrative method implemented by an association module for associating items based at least in part on physical location information.

FIG. 5 is a flow diagram of an illustrative method that may be implemented by the association module 125 for associating items based at least in part on physical location information. As discussed in connection with FIG. 1, the physical location information gathered from a physical retail store or other physical room, building or place (as discussed in connection to FIGS. 3 and 4) may be stored in the item relationship data store. Using the stored location information in the item relationship data store, the association module 125 may generate association information as discussed with reference to FIG. 5 below.

The illustrative method 500 begins at block 502, where the association module 125 retrieves a first physical location of a first item. For example, the first physical location of the first item may be part of the physical location information collected across the physical retail store as discussed in connection to FIGS. 3 and 4.

At block 504, the association module 125 retrieves a second physical location of a second item. For example, the second physical location of the second item may be part of the physical location information collected across the physical retail store as discussed in connection to FIGS. 3 and 4.

At block 506, the association module 125 determines a physical proximity between the first physical location and the second physical location. The physical proximity may be any determined physical relationship between two items as determined in any manner. For example, the physical proximity may be determined as a shortest physical distance between the first physical location and the second physical location across the coordinate system on which the physical location information is represented. In other embodiments, the physical proximity may be determined as a physical distance that accounts for a physical obstacle or layout of a physical retail store that may not be merely a shortest physical distance, such as by determining a shortest walkable path between the items' locations that avoids one or more objects between the items (such as walls, displays, barriers, shelves and/or others). Thereby, physical proximity between two physical locations that may be close together in accordance with a shortest physical distance may be separated by a much larger physical proximity (such as where two items are in adjacent rooms and separated by a common wall). Furthermore, two physical locations at a same physical distance to each other may be accorded different physical proximities (such as where two items on a same display table are accorded a higher physical proximity than two items on different display tables separated by an aisle even though the physical distance between the two items on the same table and the two items on different tables are the same). Accordingly, the physical proximity between the first physical location and the second physical location is also the physical proximity between the first item and the second item.

At block 508, the association module 125 determines a degree of association between the first item and second item based at least in part on the physical proximity between the first item and the second item (along with, optionally, other items as discussed below). In one embodiment, the degree of association may be determined at least in part by applying scaling or weighting to the physical proximity of the first item and second item. For example, in one embodiment, the degree of association may be determined by applying a linear scale to the physical proximity, such as where the degree of association may be directly mapped from the physical proximity determined in block 506 (such as where an increase in the physical proximity would yield a corresponding increase in the degree of association by a linear factor). For example, in one embodiment a proximity of "x" units would yield a degree of association of "2x" units when determining the degree of association by applying a linear scale to the physical proximity. In another embodiment, the degree of association may be determined by applying a nonlinear scale to the physical proximity, such that items in closer physical proximity are accorded a degree of association at a rate greater than items in farther physical proximity (for example, where an increase in the physical proximity would yield a corresponding increase in the degree of association by an exponential factor) or vice versa. For example, in one embodiment, a proximity of "x" units would yield a degree of association of "$x^2$" units when determining the degree of association by applying a nonlinear scale to the physical proximity. In a further embodiment, the degree of association may be determined by applying a particular linear or nonlinear scale to the physical proximity depending on physical proximity, such as where items at or greater than a specific physical proximity are scaled in a linear fashion and items less than that specific physical proximity are scaled in a nonlinear fashion or vice versa. In a yet further embodiment, the degree of association may be determined by applying a linear or nonlinear scale to the physical proximity as dependent upon item attribute information of items associated with the first item, the second item or optionally items other than the first item or the second item. In yet a further embodiment, the degree of association may be determined by applying a scale to the physical proximity in one dimension (such as in the dimension across the z axis) that is different than a scale applied to the physical proximity in another dimension (such as in the dimension across the y and/or the x axis).

In some embodiments, the association module 125 may determine a degree of association based at least in part on the physical proximity between the first item, the second item and other item(s). For example, in some embodiments, a physical location of more than two items may be retrieved at a time. Thereby, a physical proximity between each of the more than two items may be determined, such as between each of the first item, the second item and a third item. Then, a degree of association may be determined between the first and second item as discussed above that takes into account the physical proximity between the first item and the third item. For example, a degree of association between the first and third items at a same physical proximity between each other could be attributed to a third item with the same physical proximity to both the first and second items (which may be indicative of each of the first, second and third items being similar items grouped on a common display shelf).

Furthermore, item attribute information in addition to physical proximity may be utilized in accordance with a number of embodiments in determining a degree of association. For example, a particular physical proximity between items along with item attribute information that indicates that the items have attributes in common or are similar may yield a greater degree of association than if the item attribute information indicated that the items were not similar to each other.

Although the degree of association is discussed herein as being determined based upon physical proximity, in certain embodiments, the association module 125 may determine a degree of association based upon physical location information in conjunction with item attribute information without evaluating physical proximity between items. For example, in some embodiments, a degree of association between extremely similar items as determined from item attribute information, such as different sizes of the same shirt, may be determined without individually evaluating physical proximity between each item.

Furthermore, in certain embodiments, association information between items may be updated as the physical location information of more items are analyzed using the association module 125 in determining association information. In some embodiments, the association module 125 may take information other than physical proximity into account when determining the degree of association. For example, the association module 125 may determine the degree of association between different types of items (such as items of clothing and hardware items) differently than when determining the degree of association between similar items (such as between items of clothing).

At block 510, the association module 125 may optionally determine whether to associate the first and the second items based at least in part on the degree of association. The determination of whether to associate the first and second items may be made based at least in part on a threshold value of the degree of association. For example, the first and second items may be considered to be associated when their determined degree of association is at or above the threshold value of the degree of association, while the first and second items may not be considered to be associated when the degree of association between the first and second items are below the threshold value of the degree of association. A different threshold may be used based on various factors, such as the type of item, a category of the item, the store or other location being analyzed, a confidence value associated with the location data and/or other factors. In other embodiments, the determined degree of association may be stored in the item relationship data store 116 without a binary determination being made as to whether or not to associate the two items.

In some embodiments, the determined association information may also include a type of association between items, such as whether items are complementary or a substitute for each other. For example, a first item and a second item may be associated as complementary with each other when they are located near each other and item attribute information indicates that the two items are of a different type than each other (such as a men's shirt and a men's tie) and/or do not have a majority of item attributes in common. Alternatively, a first item and a second item may be associated as substitutes for each other when they are located near each other and item attribute information indicates that the two items are of the same type (such as both being men's shirts) and/or do not have a majority of item attributes in common.

In some embodiments, the items in the physical retail store may be rearranged periodically as new inventory is brought in and old inventory is taken out. Also, the same items may be displayed in different physical retail stores. The association module 125 may update the association information by updating the degree of association between items as more physical location information concerning the items is provided. For example, multiple instances of a close physical proximity between the same items, but in different physical retail stores or at different times in a same physical retail store, may reinforce a particular degree of association between the two items. Also, different instances of a different physical proximity between the same items, but in different physical retail stores or at different times in a same physical retail store, may weaken a particular degree of association between the two items as the different independently determined degrees of association in each instance are considered for the same items.

In some embodiments, one or more graphs may be used to model the association information between items. For example, each item may be represented as a node in a graph. Thereby, each item node may be connected to one or more other item nodes. In a further embodiment, connections between the item nodes may each be associated with a weighted value derived from a physical proximity between the physical locations of the items associated with the item nodes (such as the determined degree of association, discussed above). These connections may be updated as information concerning the physical locations of the items associated with the item nodes is updated. A graph of association information may be stored in a variety of data structures. For example, the graph could be stored in one or more list structures, matrix structures, or a combination of list and matrix structures. In other embodiments, graph connections may be determined from association information without actually generating or storing a graph.

In some embodiments, multiple graphs can be used to model the association information between items. For example, graphs of different styles of clothing can be implemented to represent association information between clothing of a particular style. In another example, graphs can be implemented to represent association information for items that are all either complementary or substitutes for each other. Each item node may be connected to other item nodes in accordance with a degree of association or other association information as determined from physical location information in conjunction with other information such as item attribute information. Furthermore, the graphs may be traversed to find recommendations for particular users in conjunction with other information concerning the user, such as personal information, style preferences or previous browsing history. For example, in one embodiment, a number of sub-graphs may be generated and stored for particular styles, and the particular sub-graph retrieved and traversed when recommending items to a particular user may be based at least in part on a style associated with the user (such as a style determined based at least in part on previous browsing and/or purchasing history of the user).

Figure 6:
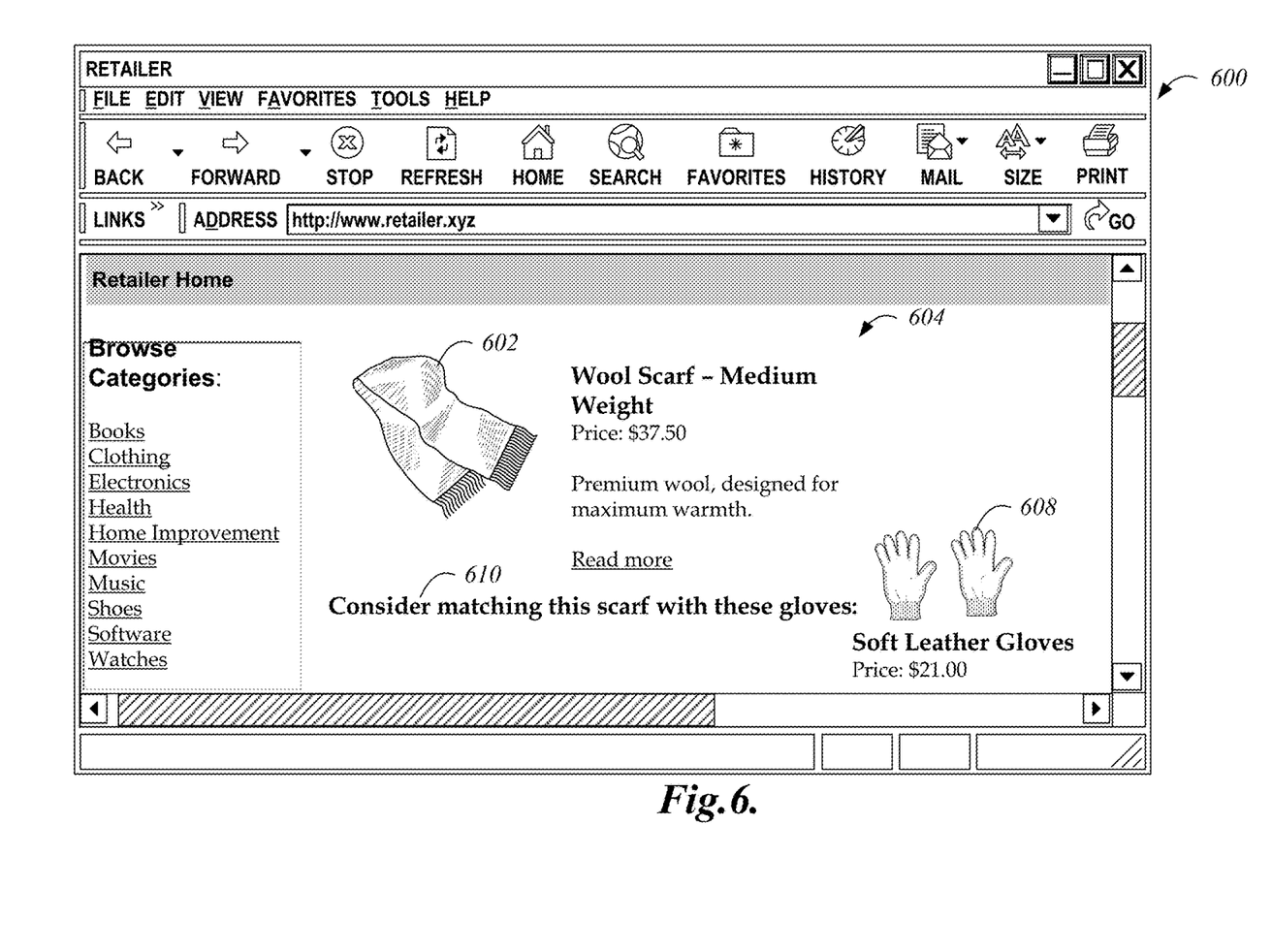
FIG. 6 is a pictorial diagram of an illustrative user interface generated at least in part by an electronic retail server that presents an item detail page with additional item recommendations based at least in part on physical location information.

FIG. 6 is an illustrative user interface 600 generated at least in part by the electronic retail server 110 that presents an item detail page 604 with additional item recommendations based at least in part on physical location information. As illustrated, the item detail page 604 features an item of interest 602. The item detail page 604 is part of a user interface 600 provided by the retail server 110 in cooperation with the relationship server 120 for providing information about the item of interest 602. The user interface 600 also presents item identification information 610 identifying an additional item 608 that is recommended based at least in part on the item 608 being associated in a complementary relationship with the item of interest 602.

For example, in the illustrated embodiment of FIG. 6, the item of interest 602 may be a wool scarf of medium weight.

The item of interest 602 may be determined based at least in part on a selection by a user via a user interface. For example, the user may have previously requested to view the item detail page 604 for the item 602 by selecting the item 602 from a search results list or other item identification information in a previously presented user interface. The relationship server 120, based at least in part on the determination that the wool scarf item 602 is of interest to the user, may cause presentation of item identification information identifying an additional item 608 as a recommended item based at least in part on the association information between the item of interest 602 and the additional item 608. Here, the additional item 608 is a pair of soft leather gloves recommended based at least in part on association information between the wool scarf of medium weight and the soft leather gloves.

According to some embodiments, the association information determined by the relationship server 120 may be used in a variety of ways other than those described above. For example, the association module 125 may be used for recommendations in conjunction with other information such as a category of items, various item metadata or attributes, items matching a search request, items recommended using any of a variety or combination of recommendation methods (such as those based at least in part on purchase history, user selection activity, item similarities and/or others), and/or other groups of items.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein may be performed in a different sequence, may be added, merged, or left out altogether (e.g., not all described acts or events are necessary for the practice of the algorithms). Moreover, in certain embodiments, acts or events may be performed concurrently, e.g., through multi-threaded processing, interrupt processing, or multiple processors or processor cores or on other parallel architectures, rather than sequentially. In addition, different tasks or processes may be performed by different machines and/or computing systems that may function together.

The various illustrative logical blocks, modules, and algorithm elements described in connection with the embodiments disclosed herein may be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The various illustrative logical blocks and modules described in connection with the embodiments disclosed herein may be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be a controller, microcontroller, or state machine, combinations of the same, or the like. A processor may include electrical circuitry configured to process computer-executable instructions. In another embodiment, a processor includes an FPGA or other programmable device that performs logic operations without processing computer-executable instructions. A processor may also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment may include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein may be embodied directly in hardware, in a software module stored in one or more memory devices and executed by one or more processors, or in a combination of the two. A software module may reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium may be coupled to the processor such that the processor may read information from, and write information to, the storage medium. In the alternative, the storage medium may be integral to the processor. The storage medium may be volatile or nonvolatile. The processor and the storage medium may reside in an ASIC. The ASIC may reside in a user terminal. In the alternative, the processor and the storage medium may reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
an electronic data store configured to at least store item identification information associated with each item of a plurality of items listed in an electronic catalog; and
a computing device including one or more processors, the computing device in communication with the electronic data store and configured to at least:
receive a set of physical location information that identifies physical locations of a plurality of tags identified by a sensor within a first physical retail store, wherein each of the plurality of tags were attached to a different item in the first physical retail store when the set of physical location information was determined by the sensor, wherein the sensor identified each tag based on at least one of radio frequency identification or near field communication;
determine, based at least in part on mapping information that associates tag identifiers with item identifiers, that a first tag of the plurality of tags is associated with a first item in the electronic catalog and that a second tag of the plurality of tags is associated with a second item in the electronic catalog;
determine a first physical location of the first tag and a first physical location of the second tag;
determine a physical proximity between the first physical location of the first tag and the first physical location of the second tag;
determine a degree of association between the first item and the second item based at least in part on (a) the determined physical proximity between the first physical location of the first tag and the first physical location of the second tag, and (b) a physical proximity between the first physical location of the first tag and a first physical location of a third tag associated with a third item;
associate the second item and the first item based at least in part on a determination that the determined degree of association between the first item and the second item is greater than a threshold;
determine that the first item is of interest to a user based at least in part on a selection by the user via a user interface of item identification information identifying the first item; and
based at least in part on the determination that the first item is of interest to the user, cause presentation of item identification information identifying the second item as a recommended item for the user.

2. The system of claim 1, wherein the computing device is further configured to at least associate the second item and the first item based at least in part on a physical proximity between a second physical location of the first item and a second physical location of the second item in a second physical retail store different than the first physical retail store.

3. A system comprising:
an electronic data store configured to at least store item identification information associated with each item of a plurality of items; and
a computing device including one or more processors, the computing device in communication with the electronic data store and configured to at least:
determine, from physical location information captured by a sensor, a first physical location of a first item and a first physical location of a second item, wherein the sensor captured (a) the first physical location of the first item based at least in part on a first tag attached to the first item and (b) the first physical location of the second item based at least in part on a second tag attached to the second item;
determine a physical proximity between the first physical location of the first item and the first physical location of the second item;
determine a degree of association between the first item and the second item based at least in part on (a) the determined physical proximity between the first physical location of the first item and the first physical location of the second item, and (b) a physical proximity between the first physical location of the first item and a first physical location of a third item; and
based at least in part on a determination that the first item is of interest, cause presentation of item identification information identifying the second item as a recommended item.

4. The system of claim 3, wherein the computing device is further configured to at least determine the degree of association between the first item and the second item based at least in part on item attribute information that describes the first item and the second item.

5. The system of claim 3, wherein the computing device is further configured to at least:

determine a degree of association between the first item and the third item based at least in part on the determined physical proximity between the first physical location of the first item and the first physical location of the third item; and associate the second item and the first item based at least in part on a determination that the degree of association between the first item and the second item is greater than a first threshold and that the degree of association between the first item and the third item is less than a second threshold.

6. The system of claim 3, wherein the computing device is further configured to at least determine the degree of association between the first item and the second item by applying a linear scale to the physical proximity between the first physical location of the first item and the first physical location of the second item.

7. The system of claim 3, wherein the computing device is further configured to at least determine the degree of association between the first item and the second item by applying a nonlinear scale to the physical proximity between the first physical location of the first item and the first physical location of the second item.

8. The system of claim 3, wherein the computing device is further configured to at least associate the second item and the first item based at least in part on a determination that the degree of association between the first item and the second item is greater than a threshold, wherein the threshold is set based at least in part on item attribute information indicating that a first category associated with the first item is different than a second category associated with the second item.

9. The system of claim 3, wherein the determination that the first item is of interest comprises identifying that the first item has been or will be presented to a user in one or more user interfaces.

10. The system of claim 3, wherein determining the physical proximity between the first physical location of the first item and the first physical location of the second item includes identifying a path that avoids one or more objects between the first physical location of the first item and the first physical location of the second item, wherein the path is longer than a shortest distance between the first physical location of the first item and the first physical location of the second item.

11. A computer-implemented method comprising:
as implemented by one or more computing devices configured with specific executable instructions,
determining, from physical location information captured by a sensor, a first physical location of a first item and a first physical location of a second item, wherein the sensor captured (a) the first physical location of the first item based at least in part on a first tag attached to the first item and (b) the first physical location of the second item based at least in part on a second tag attached to the second item;
determining a physical proximity between the first physical location of the first item and the first physical location of the second item;
determining a degree of association between the first item and the second item based at least in part on (a) the physical proximity between the first physical location of the first item and the first physical location of the second item, and (b) a physical proximity between the first physical location of the first item and a first physical location of a third item; and
associating the second item and the first item in an electronic catalog based at least in part on a determination that the determined degree of association between the first item and the second item is greater than a threshold.

12. The method of claim 11, wherein the determining the degree of association between the first item and the second item is based at least in part on a second physical location of the first item and a second physical location of the second item, wherein the second physical location of the first item and the second physical location of the second item are recorded at a time different than a time that the first physical location of the first item and the first physical location of the second item are recorded.

13. The method of claim 12, wherein the first physical location of the first item and the first physical location of the second item are recorded within a first physical area, wherein the second physical location of the first item and the second physical location of the second item are recorded within a second physical area different than the first physical area.

14. The method of claim 11, wherein the first physical location of the first item is a location relative to at least one point of reference, wherein the at least one point of reference comprises at least one of a room, a building, a mannequin, a shelf or a rack.

15. A computer-readable, non-transitory storage medium storing computer executable instructions that, when executed by one or more computer systems, configure the one or more computer systems to perform operations comprising:
determining, from physical location information captured by a sensor, a first physical location of a first item and a first physical location of a second item, wherein the sensor captured (a) the first physical location of the first item based at least in part on a first tag attached to the first item and (b) the first physical location of the second item based at least in part on a second tag attached to the second item;
determining a physical proximity between the first physical location of the first item and the first physical location of the second item;
determining a degree of association between the first item and the second item based at least in part on (a) the determined physical proximity between the first physical location of the first item and the first physical location of the second item, and (b) a physical proximity between the first physical location of the first item and a first physical location of a third item; and
based at least in part on a determination that the first item is of interest, causing presentation of item identification information identifying the second item as a recommended item.

16. The computer-readable, non-transitory storage medium of claim 15, wherein the operations further comprise associating the first item and the second item in an electronic data store based at least in part on a determination that the degree of association between the first item and the second item is greater than a threshold.

* * * * *